Figure 1:
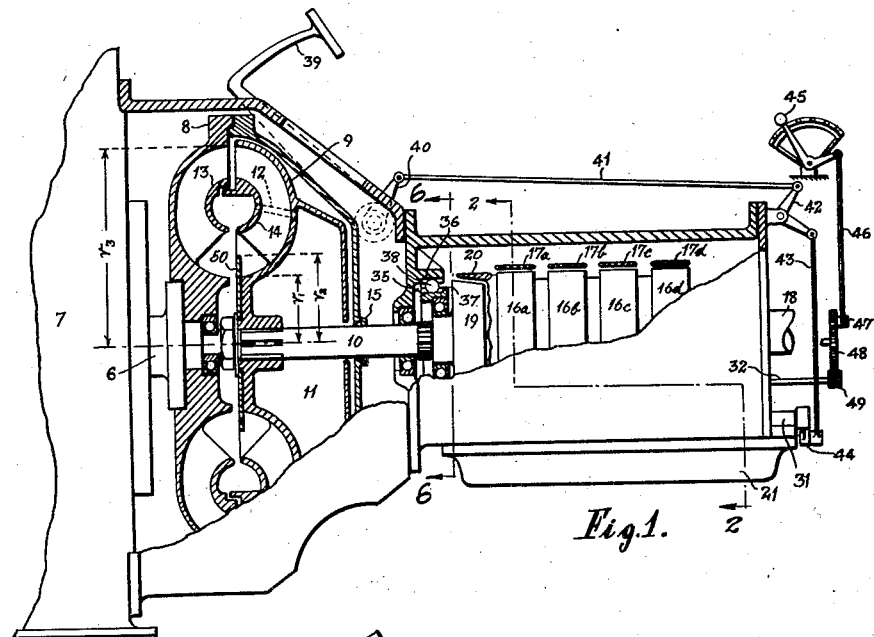

Nov. 28, 1939.   H. SINCLAIR   2,181,711
POWER TRANSMISSION SYSTEM
Filed June 13, 1935   2 Sheets-Sheet 1

Harold Sinclair
By Dean, Fairbank, Hirsch & Foster

Nov. 28, 1939.  H. SINCLAIR  2,181,711
POWER TRANSMISSION SYSTEM
Filed June 13, 1935     2 Sheets-Sheet 2
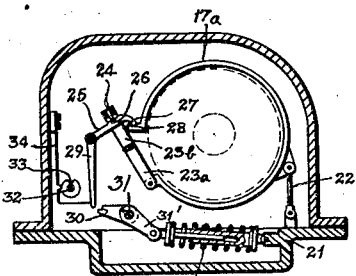
Fig. 2.
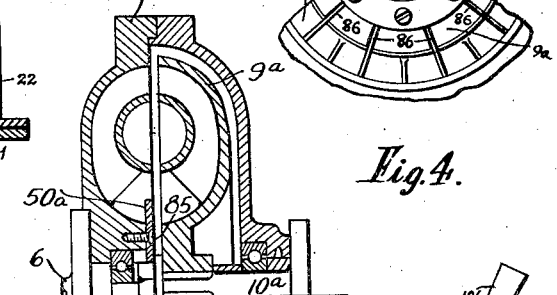
Fig. 9.    Fig. 4.
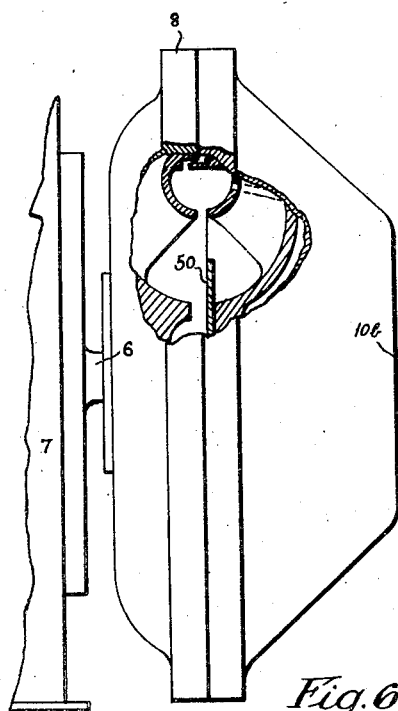
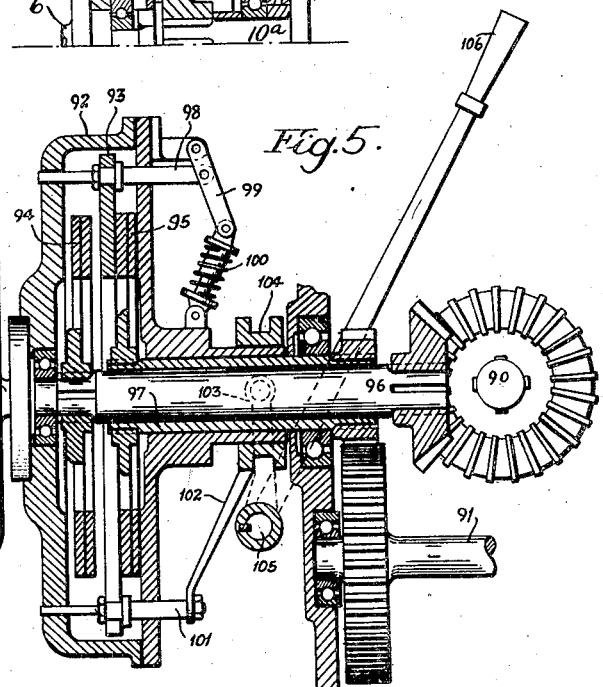
Fig. 5.
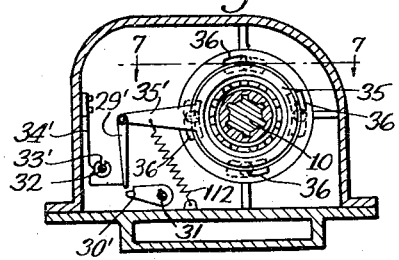
Fig. 6.
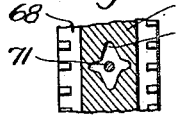
Fig. 8.
Fig. 7.
Harold Sinclair Patented Nov. 28, 1939

2,181,711

UNITED STATES PATENT OFFICE 2,181,711

POWER TRANSMISSION SYSTEM

Harold Sinclair, Kensington, London, England

Application June 13, 1935, Serial No. 26,344
In Great Britain November 14, 1934

4 Claims. (Cl. 60—54)

The present invention relates to power transmission systems of the type comprising, in combination, a hydraulic coupling of the kinetic type and a friction device operable for interrupting and reconnecting the transmission system, the hydraulic coupling having a vaned impeller member in the form of an annularly dished shell juxtaposed to a vaned runner member of similar form, so that the impeller and runner together form a toroidal working circuit in which the working liquid can circulate in the form of a vortex ring, and the coupling being of the "constant-filling" type (that is, it is not provided with means whereby it can be emptied and filled at will during operation). The hydraulic coupling of the present invention is especially adapted for use in combination with multi-ratio or selective gearing of the type which comprises or is associated with a friction clutch or clutches or comprises a friction brake or brakes and in which said frictional device or devices are operable for disconnecting and reconnecting the transmission, as distinct from the type of gearing which is neither provided nor associated with a frictional device operable for disconnecting and reconnecting the transmission.

It is well known that when the impeller of such a coupling is rotating at low speed, the runner can be easily stalled, since the torque transmission capacity of the coupling is low under these conditions, but, when the impeller is rotating at high speed, the torque transmission capacity of the coupling is high. In applying such couplings for example, to automobiles, it is usual to arrange for the normal maximum working torque to be transmitted with a slip of about 2 per cent, and with such an arrangement, if the slip is forcibly varied to a considerable extent when the coupling is rotating fast, the torque load rises to an inconveniently high value.

With multi-ratio gearing of the kind above set forth, it is possible to make a rapid change from one ratio to another, a friction clutch or brake serving, on engagement, to force the speeds of the driving and the driven shafts of the gearing into the ratio of the engaged gear. In the case of an automobile or railcar, owing to the high inertia of the vehicle, the speed of the driven shaft of the gear cannot be varied rapidly, so that a sudden gear change causes a sudden change in the speed of the driving shaft of the gear and of the coupling runner attached thereto. Owing to the inertia of the engine, the coupling impeller cannot change speed as rapidly as does the coupling runner when the gear is suddenly changed, so that the coupling slip rises temporarily to a high value, producing a torque of many times the normal full-load torque. In low gear the drag torque is multiplied by the low gear ratio. Such overloads cause some discomfort to passengers, and may apply undue strain to the transmission system.

In the case of a crane, where, for example, a power transmission system of the type set forth is used to drive the sluing mechanism, operation of the selective gearing to reverse the motion of the crane while the crane is sluing may result in heavy overloading of the driving motor and jerky movement of the crane.

The object of the present invention is to provide a power transmission system of the type set forth in which the liability to overloading is substantially reduced, and which is therefore especially suitable for use with automotive vehicles.

The specification of my United States Patent No. 2,074,346 describes how, when hydraulic couplings of the kinetic type and of the kind that can be emptied and filled during operation are employed to couple a driven machine to a continuously running driving machine, violent cyclical torque surges may occur as the coupling is being filled for the purpose of starting the driven machine, these surges occurring when the slip is high and there is only a shallow vortex ring of liquid in the working chamber. That specification discloses the use of a baffle, located near the radially inner part of the working circuit, which operates to break up a shallow high-velocity vortex circulation, and so eliminate torque surges, but does not substantially affect the operation of the coupling when the slip is low and the liquid circulates in a deep vortex of low velocity.

It was thought that a baffle small enough to allow a satisfactory efficiency of power transmission at normal loads and speeds would not be capable of influencing to any appreciable extent the vortex flow in the working circuit when the liquid content was large. I have now discovered, however, that with the very large slip that can be imposed on constant-filling couplings when used in combination with multi-ratio gears or selective gears of the kind above specified, a baffle can be employed as a torque-limiting device which is ineffective during rapid gear-changing or gear engaging operations but does not adversely affect the slip under normal fast running conditions.

The present invention solves an important problem, in a power transmission system comprising, in combination, a friction clutch or—its equivalent—a friction brake on an element of an epicyclic gear train, said friction device being operable for disconnecting and reconnecting the transmission, and a hydraulic coupling of the constant-filling or sealed kinetic type set forth. In the present invention there is provided a baffle member of fixed magnitude, mounted on the driving or driven part of the coupling of the constant-filling type and projecting into the working circuit at or near the radially inner part of the boundary thereof, the size of the baffle member being such that it does not substantially reduce the efficiency of the coupling at normal loads and speeds, but that it serves to limit the rise in torque that occurs when the slip in the coupling is raised as a result of operation of said frictional device. The baffle is conveniently formed as an annular or circular disc accommodated between the driving and the driven coupling parts.

The invention will be further described with reference to the accompanying diagrammatic drawings, in which—

Figure 3:
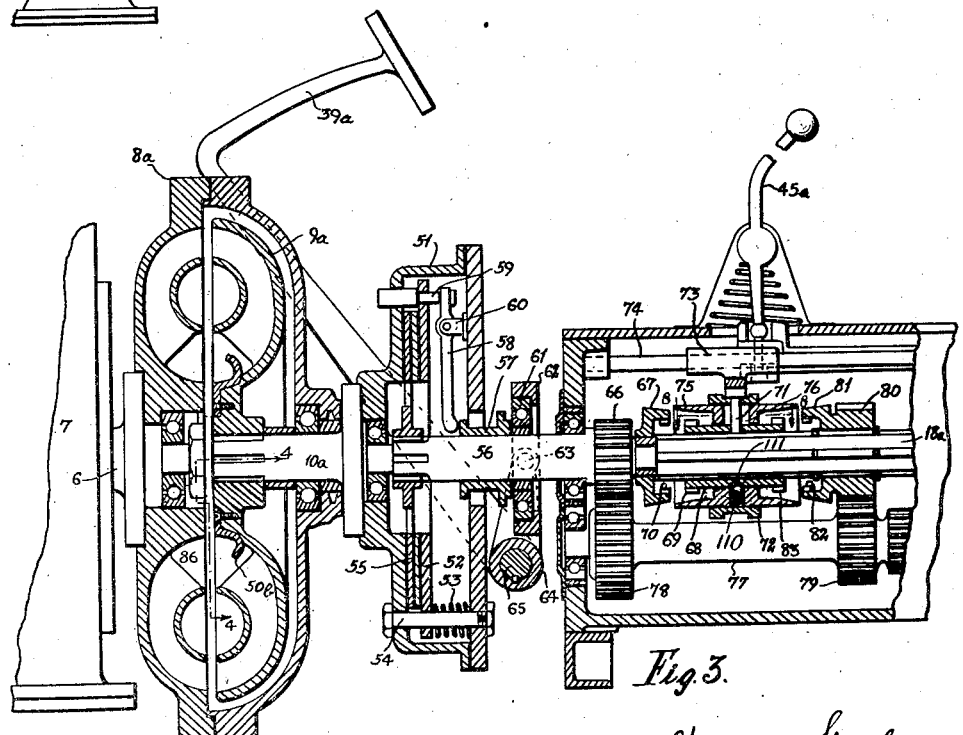

Fig. 1 is a part sectional elevation of part of the power transmission system of an automobile, Fig. 2 is a view of a detail in sectional end elevation, taken on the line 2—2 in Fig. 1, Fig. 3 is a sectional side elevation of part of another form of automobile power transmission system, Fig. 4 is a view of a detail in sectional end elevation, taken on the line 4—4 in Fig. 3, Fig. 5 is a part sectional side elevation of part of a transmission system embodying selective gearing, Fig. 6 is a view of a detail, in sectional end elevation, taken on the line 6—6 in Fig. 1, Fig. 7 is a sectional plan of a detail, taken on the line 7—7 in Fig. 6, Fig. 8 is a sectional plan of a detail, taken on the line 8—8 in Fig. 3, and Fig. 9 is a sectional side elevation of a part of an alternative form of hydraulic coupling.

Figs. 1 and 2 show the well-known combination of a hydraulic coupling with a change-speed gearing of the Wilson epicyclic preselector type. As this gearing has been fully described in, for example, British Patents Nos. 164,042 and 328,660, it will be unnecessary here to describe it fully.

To the crank-shaft 6 of an internal-combustion engine 7 is fixed the driving part 8 of a hydraulic coupling of the kinetic type. The driven part 9 of the coupling, which is keyed to a transmission shaft 10, is provided with a reservoir chamber 11 having an effective capacity of about one-quarter or one-fifth of the volume of the annular hydraulic working circuit and communicating with the circuit by transfer passages 12 opening into the the interior of core guide rings 13 and 14 forming portions of the driving and the driven coupling parts respectively. This arrangement ensures an automatic regulation of the liquid content, as described in the specification of my United States Patent No. 1,963,720. Such a coupling is to be regarded for the purpose of the present specification as of the constant-filling type, since it is sealed by a gland 15, and since the total liquid content of the circuit and of the reservoir cannot be varied at will during operation.

The change-speed gearing comprises four brake drums 16a, 16b, 16c and 16d which are directly connected to gear elements of four compounded planetary gear trains accommodated within them. These drums are adapted to be braked, to yield respectively three indirect forward ratios and a reverse gear between the shaft 10 and an output shaft 18, by brake bands 17a, 17b 17c and 17d. Direct drive is established by engagement of a friction clutch having an inner conical member 19 slidably splined to the transmission shaft 10 and a co-operating conical drum 20 fixed to the drum 16a. Fig. 2 shows, by way of example, the operating gear for the third speed brake band 17a. The brake band is supported from a gear casing 21 by suitable means indicated diagrammatically by the link 22. To one end of the brake band are pivoted a pair of parallel links 23a and 23b which carry a knife-edge bridge piece 24. The link 23a is shown with its upper end broken away. A floating lever 25, which lies between the links 23a and 23b, is provided with a groove 26 in which the knife edge 24 rests, and with a knife-edge 27 resting in a groove 28 formed in the other end of the brake band. Pivoted to the lever 25 is a strut 29 adapted to be engaged by a notch 30 on a bus-bar 31 journalled in the gear casing and urged in a clockwise direction by a control spring 31a, acting on an arm 31' fixed to the bar 31. A control cam shaft 32 is provided with a cam having a notch 33 co-operating with a spring 34. When the cam is turned so that the spring engages the notch, the free end of the spring urges the pivoted strut 29 in such a direction that it will engage over the notch 30 when the bus-bar 31 is moved into its extreme anti-clockwise position, in which it appears in Fig. 2. When the bus bar is moved clockwise by the control spring, the strut rises, and the lever 25 rocks clockwise, contracting the brake band 17a on the drum 16a.

The clutch 19, 20 is actuated by means of an axially slidable thrust collar 35 adapted to be rocked by the bus-bar in known manner. To the thrust collar 35 is fixed a radial arm 35' (Figs. 6 and 7) to which is pivoted a strut 29' adapted to be engaged by a notch 30' on the bus-bar 31. A cam having a notch 33' on the cam shaft 32 cooperates with a spring 34'. When the cam is turned so that the spring engages the notch, the free end of the spring causes the strut 29' to cooperate with the bus-bar similarly to the strut 29 described with reference to Fig. 2. When the strut rises, the thrust collar 35 is caused to rotate clockwise, as viewed in Fig. 6. When the strut falls, the thrust collar is rotated anti-clockwise by a return spring indicated diagrammatically at 112. Balls 38 engaged in helical grooves 36 and 37 formed in the casing and the collar cause the collar to move axially to operate the clutch when the collar is rocked about the axis of the gearing.

The bus-bar 31 can be rocked, against the force of the control spring, by depression of a pedal 39 connected to the bus-bar by a suitable linkage, which is shown diagrammatically in Fig. 1 as consisting of a lever 40, a link 41, a bell crank 42, a link 43, and a crank 44 fixed to the bus-bar 31. Figs. 2 and 6 show the position of the bus-bar 31 when the pedal 39 is fully depressed. In Fig. 1 this pedal is shown fully raised. The cam-shaft can be rotated, to pre-select the ratio to be engaged by operation of the pedal 39, by a lever 45, shown diagrammatically as connected to the cam-shaft 32 by a connecting-rod 46, a crank pin 47, and toothed wheels 48 and 49. The several cam notches, such as 33 and 33', cooperating with the several brake-band-actuating linkages are so angularly disposed in relation to one another that only the notch of the selected gear is turned horizontally from the gear shaft axis.

The gear casing contains a supply of lubricating oil which, while the gear is operating, is continuously distributed over the gear mechanism. Consequently, during gear-changing all the friction surfaces of the brakes and clutch become flooded with oil; and in order to secure a sufficiently rapid take-up of the drive after gear-changing, the brakes and clutch must be so adjusted that they will be capable of transmitting many times their normal full-load torque when they are finally engaged and the surplus oil has been squeezed from between the friction surfaces. Consequently, when a careless driver changes to say top gear from first or second gear with the engine running at a high speed, it is possible for such a gear to transmit a torque sufficiently high to overstrain the transmission system.

In order to eliminate this risk, the hydraulic coupling is provided with a baffle member 50 in the form of an annular plate fixed, in this example, to the boss of the driven part 9, the baffle being of such a diameter that it projects into the working circuit at the radially inner part of the junction between the driving and the driven parts.

The action of the improved arrangement is believed to be the following. Constant-filling couplings are invariably operated with a liquid content less than their maximum capacity, the air space allowing for expansion of the liquid during operation without undue pressure rise. When the slip, and consequently the speed of the vortex circulation are low, the stream of liquid returning from the driven part 9 to the eye of the driving part 8 is diverted, by the action of centrifugal force due to the rotation of the liquid about the coupling axis, away from the coupling axis. Consequently air collects in the neighbourhood of the baffle 50, the liquid stream flowing clear of the radially inner part of the circuit boundary. When however, the slip is forcibly raised by a rapid gear-changing operation, the circulation velocity rises until centrifugal force due to the vortex circulation overcomes the centrifugal force due to the rotation of the liquid about the coupling axis. The liquid stream now clings to the radially inner part of the circuit boundary, and the radially innermost layer of liquid strikes the baffle 50, is diverted thereby radially outward and impinges on the remainder of the liquid stream entering the eye of the driving part or the driven part (according to whether the torque is in the driving or overrunning direction respectively). In this way the vortex circulation is retarded sufficiently to limit the torque to an unobjectionable value.

The size of the baffle may be varied to suit circumstances: where a very low slip at normal torque is desirable and a fairly high overload is permissible, a small baffle should be used; where however, it is necessary to limit the possible overload to a fairly low value, a larger baffle should be used. In the coupling shown in Fig. 1 the ratio of the minimum radius $r_1$ to the maximum radius $r_3$ of the circuit is 1 to 3.1 and the size of the baffle, expressed as radius of the baffle (denoted by $r_2$) divided by $r_1$, is 1.4 to 1. The presence of this baffle does not increase the slip at ordinary fast running speeds and torque. With the same speed of the driving part, when the slip is suddenly increased to 30 per cent, the baffle reduces the overload torque from 11 to 4 times the normal full-load torque. Corresponding figures for a rapid change to 60 per cent slip are 16 and 5, and, for the condition where the driven part is suddenly stalled, 19 and 5½ times normal full-load torque.

A baffle as small as 1.15 (the size being defined in the manner described above) may be large enough in some cases, while where it is necessary to limit the maximum possible torque to a relatively low value, a 1.5 baffle may be used. For most applications, however, the range of baffle size between 1.2 and 1.4 will serve.

The transmission system shown in Fig. 3 includes a simple constant-filling coupling, the driven part of which is coupled through a friction clutch to a change-speed gearing of the well-known "synchromesh" type. The driven coupling part 9a is keyed to an intermediate shaft 10a to which is fixed the body 51 of a friction disc clutch having a presser plate 52 urged towards the body 51 by a plurality of springs one of which is shown at 53. The presser plate is slidably carried on a plurality of driving pins as at 54. A driven element 55 is splined to a gear shaft 56, on which is journalled a sleeve 57 bearing against the ends of a plurality of similarly arranged levers, one of which is shown at 58. Each lever is pivotally attached to a bracket 60 mounted on the clutch driving part, and draw bolts, such as 59, connect the levers 58 to the presser plate 52. The sleeve 57 carries a thrust bearing 61 housed in a ring 62 pivotally engaged at 63 with an actuating yoke 64 keyed to a transverse shaft 65. A control pedal 39a is keyed to the shaft 65, and, when depressed, disengages the clutch. The shaft 56 is integral with a pinion 66 and a friction inner cone 67 of the direct drive synchronizing clutch of the change-speed gearing, the synchronising mechanism shown diagrammatically by way of example being of well known form. A jaw clutch member 68, slidably splined to the output shaft 18a of the gearing, is provided with teeth 69 adapted to engage with teeth 70 formed on the interior of the cone 67.

A plurality of radial pins, one of which is shown at 71, fixed to the member 68 engage in a grooved actuating collar 72 engaged by a selector 73 adapted to be slid along a guide 74 by a gear control lever 45a. The outer cone member of the synchronising clutch has the form of a sleeve 75 slidable longitudinally of the jaw clutch member 68 to an extent determined by the width of diamond shaped radial holes 76 accommodating the pins 71 (Fig. 8). Fixed to a counter-shaft 77 is a wheel 78 meshing with the pinion 66 and a pinion 79 meshing with a second-speed wheel 80 journalled on the output shaft 18a and integral with a friction cone 81 and jaw clutch teeth 82, the latter being adapted to mesh with teeth 83 on the clutch member 68. A spring-loaded detent 110, housed in the sleeve 75 and cooperating with a circumferential groove 111 in the clutch member 68 tends to maintain the synchroniser sleeve 75, relative to the jaw clutch element 68, in the position shown in Fig. 3.

In engaging, for example, second gear from direct drive while the vehicle is running, the main friction clutch 51, 52 is disengaged and the lever 45a is operated so as to move the jaw clutch element 68 to the right until the sleeve 75 engages the slower running cone 81, with the result that the sleeve 75 is retarded relative to the jaw clutch element 68 and the pins 71 are locked in the leading ends of the diamond shaped holes 76. Engagement of the synchronising clutch 75, 81 causes the gear wheel 80, the counter-shaft 77 and the gear shaft 56 to be accelerated, so that the driven plate 55 of the main clutch is rotating substantially faster than the driving part 51 of this clutch. As soon as the speeds of the synchronising sleeve 75 and the cone 81 are synchronised, the pins 71 are free to move to the sides of the diamond shaped holes 76, so that the lever 45a can be further operated to engage the clutch teeth 82 and 83.

If during this operation the vehicle is running at a high speed and the speed of the engine is allowed to fall, and if the pedal 39a is thereafter released rapidly to engage the main friction clutch, the driven part 9a of the hydraulic coupling will be violently accelerated to a speed much higher than that of the driving part, so that an undesirably high over-running torque would be applied to the system if the hydraulic coupling were not adapted to limit such excessive torque.

In this example the coupling is provided with an annular baffle 50b fixed to the runner 9a and dished so that its periphery projects into the circuit at a short distance away from the junction between the driving and the driven parts. As shown in Fig. 4, the radially outer part of the baffle is slotted to accommodate the long runner vanes 86.

An alternative design of coupling, applicable to the power transmission systems herein described, is shown in Fig. 9. An annular baffle 50a is fixed by screws 85 to the boss of the driving part 8a.

Fig. 5 shows an application of the invention to selective gearing in which the shafts 90 and 91 are arranged to effect two alternative motions in for example a crane. Fixed to the driven shaft 10b of the hydraulic coupling is a friction clutch body 92 provided with a floating presser plate 93 adapted to engage alternatively two independent driven plates 94 and 95 drivably coupled to co-axial shafts 96 and 97 geared to the shafts 90 and 91 respectively. A plurality of pins such as 98 are fixed to the plate 93, slidably mounted in the body 92 and pivoted to spring toggle systems such as 99, 100. A plurality of pins such as 101 are also fixed to the plate 93 and to a spider 102 which is slidable axially of the clutch axis by a yoke 103 engaging in a groove 104 and keyed to a shaft 105 which can be rocked by a control lever 106. Movement of the lever 106 from one extreme position to another causes the toggles 99, 100 to snap over dead centre, disengaging one of the driven plates 94 and 95 and engaging the other of these plates.

Violent operation of the lever 106 when the engine 7 is running fast may cause a high slip in the hydraulic coupling. To prevent excessive torque under such conditions, the hydraulic coupling is provided with a baffle 50 which operates as hereinbefore described to check the circulation velocity when the slip rises above a particular value.

I claim:

1. A hydraulic coupling of the constant-filling kinetic type as hereinbefore defined comprising a rotatable driving member and a rotatable driven member, said members being juxtaposed to form between them an annular working circuit, a reservoir chamber rotatable with one of said members, a duct communicating between said circuit and said reservoir chamber and serving automatically to remove liquid from said circuit at a relatively slow rate when the slip between said members increases, and a baffle member projecting into the radially inner part of said circuit and serving to produce a substantially instantaneous retardation of the circulation in said circuit when the slip is suddenly increased.

2. In a hydraulic coupling of the constant-filling kinetic type comprising a hollow rotatable fluid-tight casing provided with driving vanes accommodated in an annularly dished portion of an end wall thereof, a shaft passing through a central aperture in an end wall of said casing, a driven vaned element fixed to said shaft and juxtaposed to said dished portion to form therewith an annular working circuit in which working liquid can circulate in the form of a toroidal ring, and a gland associated with said shaft and said aperture to maintain the liquid content of said casing invariable while said coupling is operating, the combination with said circuit of a discontinuity in the boundary thereof so positioned and shaped as to deflect only the outer layers of the circulating liquid vortex at least in part towards the circuit core, so as to limit the torque-transmission capacity of the coupling upon sudden changes in the speed of rotation of said driven element, due to sudden changes in load, while the speed of the driving casing changes relatively slightly.

3. In a hydraulic coupling of the kinetic type comprising a hollow rotatable fluid-tight driving casing provided with vanes accommodated in an annularly dished portion of an end wall thereof, a shaft passing through a central aperture in an end wall of said casing, a vaned driven element fixed to said shaft and juxtaposed to said dished portion to form therewith an annular working circuit in which working liquid can circulate in the form of a toroidal ring, a gland associated with said shaft and said aperture to maintain the volume of liquid contained by said casing invariable while the coupling is operating, and a reservoir space, which has a capacity of at least one-fifth of the capacity of said working circuit and which communicates with said circuit, being accommodated between the back of said driven element and said casing, the combination with said circuit of a discontinuity in the boundary thereof so positioned and shaped as to deflect only the outer layers of the circulating liquid vortex at least in part towards the circuit core, so as to limit the torque-transmission capacity of the coupling upon sudden changes in the speed of rotation of said driven element, due to sudden changes in load, while the speed of the driving casing changes relatively slightly.

4. In a hydraulic coupling of the kinetic type comprising a hollow rotatable fluid-tight driving casing provided with vanes accommodated in an annularly dished portion of an end wall thereof, a shaft passing through a central aperture in an end wall of said casing, a vaned driven element fixed to said shaft and juxtaposed to said dished portion to form therewith an annular working circuit in which working liquid can circulate in the form of a toroidal ring, a gland associated with said shaft and said aperture to maintain the volume of liquid contained by said casing invariable while the coupling is operating, and a reservoir space, which has a capacity of at least one-fifth of the capacity of said working circuit and which communicates with said circuit, being accommodated between the back of said driven element and said casing, the combination with said circuit of a baffle member of fixed magnitude projecting into said circuit in the neighbourhood of the portion thereof nearest the axis of said shaft and capable of deflecting only the outer layers of the circulating liquid vortex at least in part towards the circuit core, so as to limit the torque-transmission capacity of the coupling upon sudden changes in the speed of rotation of said driven element, due to sudden changes in load, while the speed of the driving casing changes relatively slightly.

HAROLD SINCLAIR.